United States Patent
Li et al.

(10) Patent No.: US 9,697,129 B2
(45) Date of Patent: Jul. 4, 2017

(54) MULTIPLE WINDOW BASED SEGMENT PREFETCHING

(71) Applicant: International Business Machines Corporation, Armonk, NY (US)

(72) Inventors: Shuo Li, Beijing (CN); Xin Ying Yang, Beijing (CN); Xiang Zhou, Hangzhou (CN)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 14/753,686

(22) Filed: Jun. 29, 2015

(65) Prior Publication Data

US 2016/0378669 A1 Dec. 29, 2016

(51) Int. Cl.
*G06F 12/08* (2016.01)
*G06F 12/0862* (2016.01)
*G06F 9/45* (2006.01)

(52) U.S. Cl.
CPC ........ G06F 12/0862 (2013.01); G06F 8/4442 (2013.01); *G06F 2212/1021* (2013.01); *G06F 2212/602* (2013.01); *G06F 2212/6022* (2013.01)

(58) Field of Classification Search
CPC ............... G06F 12/0862; G06F 8/4442; G06F 9/30047; G06F 9/3802; G06F 9/3806; G06F 9/3814; G06F 9/383; G06F 17/30132; G06F 2212/0602; G06F 2212/06022; G06F 2212/06024; G06F 2212/06026; G06F 2212/6026; G06F 2212/6028
See application file for complete search history.

(56) References Cited

U.S. PATENT DOCUMENTS

| 588,715 A | 8/1897 | Ingraham |
| 5,600,817 A * | 2/1997 | Macon, Jr. .......... G06F 12/0862 |
| | | 711/113 |
| 5,761,706 A * | 6/1998 | Kessler ............... G06F 12/0862 |
| | | 711/118 |

(Continued)

OTHER PUBLICATIONS

Liang et al.; "STEP: Sequentiality and Thrashing Detection Based Prefetching to Improve Performance of Networked Storage Servers"; Distributed Computing Systems, 2007, ICDCS'07. 27th International Conference on Jun. 25-27, 2007, © 2007 IEEE, pp. 1-10.

(Continued)

*Primary Examiner* — Kaushikkumar Patel
(74) *Attorney, Agent, or Firm* — Edward P. Li

(57) ABSTRACT

A method, a computer program product, and a computer system for implementing multiple window based segment prefetch used for data pages that are out of sequence. A computer initiates a buffer for the segment prefetch. The computer builds up windows in the buffer, each of the windows comprising data pages among which neighboring data pages are within a predetermined distance therebetween. The computer determines whether a respective one of the windows exceeds a predetermined window size. The computer triggers the segment prefetch, in response to determining that the respective one of the windows exceeds the predetermined window size. The computer uses an asynchronous I/O to get the data pages in the respective one of the windows.

15 Claims, 4 Drawing Sheets

(56) References Cited

U.S. PATENT DOCUMENTS

| | | | |
|---|---|---|---|
| 6,070,230 A * | 5/2000 | Capps | G06F 9/383 |
| | | | 711/137 |
| 6,226,715 B1 * | 5/2001 | Van Der Wolf | G06F 12/121 |
| | | | 711/133 |
| 6,272,590 B1 | 8/2001 | Riedle | |
| 6,317,811 B1 * | 11/2001 | Deshpande | G06F 9/345 |
| | | | 711/137 |
| 6,490,658 B1 | 12/2002 | Ahmed et al. | |
| 6,567,894 B1 * | 5/2003 | Hsu | G06F 12/0862 |
| | | | 711/137 |
| 6,571,318 B1 | 5/2003 | Sander et al. | |
| 7,877,546 B2 | 1/2011 | Zohar et al. | |
| 8,380,680 B2 | 2/2013 | Berger et al. | |
| 8,429,351 B1 | 4/2013 | Yu et al. | |
| 8,549,108 B2 | 10/2013 | Kini et al. | |
| 2003/0191901 A1 * | 10/2003 | Hill | G06F 9/383 |
| | | | 711/137 |
| 2006/0212658 A1 | 9/2006 | Hrle et al. | |
| 2009/0055587 A1 * | 2/2009 | Kellar | G06F 12/0862 |
| | | | 711/118 |
| 2013/0339625 A1 | 12/2013 | Prasky et al. | |

OTHER PUBLICATIONS

Zivkov et al.; "Disk Caching in Large Databases and Timeshared Systems"; Sep. 1996, pp. 1-75.

* cited by examiner

MULTIPLE WINDOW BASED SEGMENT PREFETCHING

TECHNICAL FIELD OF THE INVENTION

The present invention relates generally to prefetch, and more particularly to a method of multiple window based segment prefetch for data pages that are out of sequence.

BACKGROUND

In a Prefetch method, it is determined in advance that a set of data blocks is about to be used, and then the entire set of data is read into a buffer or cache with a single asynchronous I/O operation. Currently, there are three main prefetch methods in many computing systems. The first prefetch method is dynamic prefetch. In the dynamic fetch, a computer system expects that data on pages to be accessed is sufficiently non-sequential to invoke dynamic prefetch. Dynamic prefetch uses sequential detection in runtime. The second prefetch method is sequential prefetch. In the sequential prefetch, data pages that are read in advance are sequential. A table space scan always uses sequential prefetch; however, an index scan may not use it. The third prefetch method is list prefetch. In the list prefetch, one or more indexes are used to select the PAGESs for a list of data pages to be read in advance; the pages need not be sequential. Usually, the PAGESs are sorted.

Sequential prefetch is used a lot during table scan for a database data management engine. Dynamic prefetch requests the fetching data pages is nearly in sequence. List prefetch sorts PAGES in advance, which can be applied for data with B+tree index built on it.

When the scale and the dimension of data are large or when the data pages or blocks are not in order, there is no effective prefetch method for common cases. Usually, some computing systems may use dynamic prefetch or no prefetch. For some of the situations, all the current prefetch approaches do not perform well from application's I/O performance perspective.

SUMMARY

In one aspect, a method for implementing multiple window based segment prefetch used for data pages that are out of sequence is provided. The method is implemented by a computer. The method includes initiating a buffer for the segment prefetch. The method further includes building up windows in the buffer, wherein each of the windows comprise data pages among which neighboring data pages are within a predetermined distance therebetween. The method further includes determining whether a respective one of the windows exceeds a predetermined window size. The method further includes, in response to determining that the respective one of the windows exceeds the predetermined window size, triggering the segment prefetch. The method further includes using an asynchronous I/O to get the data pages in the respective one of the windows.

In another aspect, a computer program product for implementing multiple window based segment prefetch used for data pages that are out of sequence is provided. The computer program product comprises a computer readable storage medium having program code embodied therewith. The program code is executable to: initiate a buffer for the segment prefetch; build up windows in the buffer, each of the windows comprising data pages among which neighboring data pages are within a predetermined distance therebetween; determine whether a respective one of the windows exceeds a predetermined window size; trigger the segment prefetch, in response to determining that the respective one of the windows exceeds the predetermined window size; and use an asynchronous I/O to get the data pages in the respective one of the windows.

In yet another aspect, a computer system for implementing multiple window based segment prefetch used for data pages that are out of sequence is provided. The computer system comprises one or more processors, one or more computer readable tangible storage devices, and program instructions stored on at least one of the one or more computer readable tangible storage devices for execution by at least one of the one or more processors. The program instructions are executable to initiate a buffer for the segment prefetch. The program instructions are executable to build up windows in the buffer, each of the windows comprising data pages among which neighboring data pages are within a predetermined distance therebetween. The program instructions are executable to determine whether a respective one of the windows exceeds a predetermined window size. The program instructions are executable to trigger the segment prefetch, in response to determining that the respective one of the windows exceeds the predetermined window size. The program instructions are executable to use an asynchronous I/O to get the data pages in the respective one of the windows.

DETAILED DESCRIPTION

Embodiments of the present invention provide a new mprefetch method: segment prefetch. The segment prefetch is mainly used when the dimension of data is large and/or data pages are not in a sequence. The method of segment prefetch caches the part of pages in a buffer and calculates the most efficient segments for prefetch.

Figure 1:
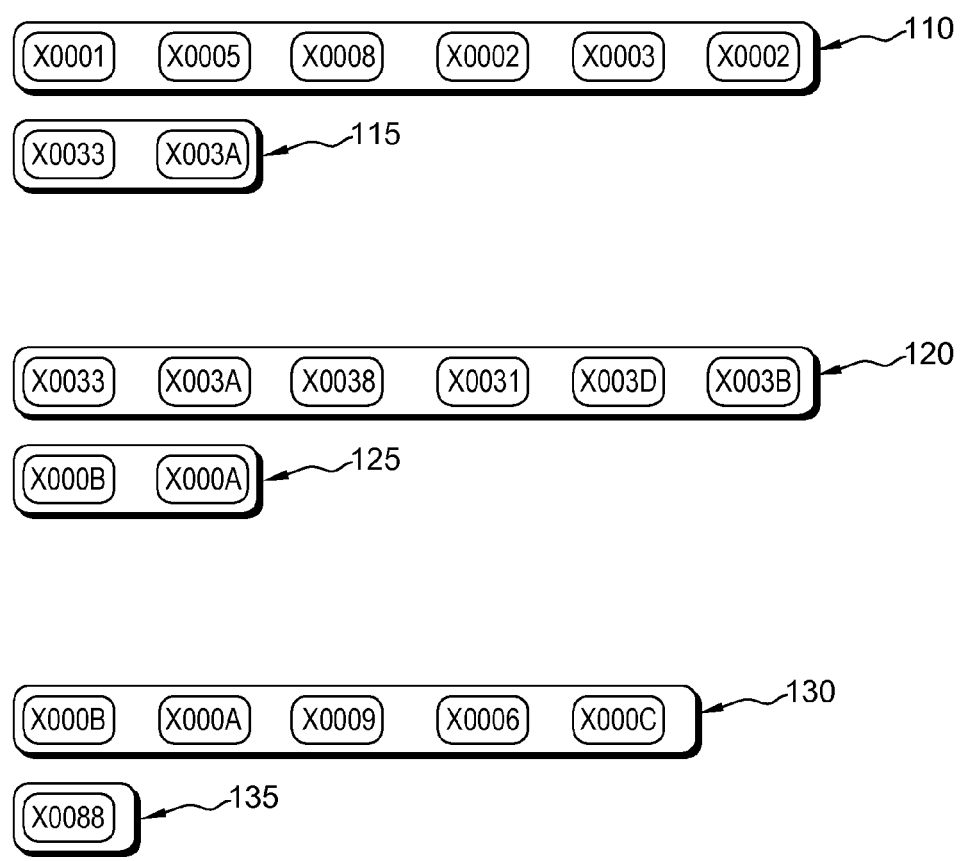
FIG. 1 includes diagrams showing an example of segment prefetch, in accordance with one embodiment of the present invention.

FIG. 1 includes diagrams showing an example of segment prefetch, in accordance with one embodiment of the present invention. During runtime, a buffer is built up to cache pages. For example, IDs of the pages are listed below.

X0001, X0005, X0008, X0033, X0002, X0003, X003A, X0002, X0038,

X0031, X000B, X003D, X000A, X003B, X0009, X0006, X0088, X000C

Embodiments of the present invention introduce four parameters: Window_Range, Window_Size, Max_Windows, and Page_Live. Window_Range is defines a maximum distance between two neighboring pages in a window.

Window_Size defines a threshold of pages (or maximum pages in a window) that triggers segment prefetch. Max_Windows is the maximum number of windows in a buffer. Page_Live defines a time limit that pages can stay in the buffer. In the example shown in FIG. 1, Window_Range is set as 16 and Window_Size is set as 4.

First, a computer system reads pages into the buffer. For the example in which the buffer size is 8, the first 8 pages in the list of IDs of the pages (as shown in a previous paragraph) are read into the buffer. The first page (X0001) and the second page (X0005) have Window_Range less than 16; therefore, they are read into window 110 shown in FIG. 1. Similarly, the second page (X0005) and the third page (X0008) also have Window_Range less than 16; therefore, the third page (X0008) is read into window 110 shown in FIG. 1. However, Window_Range between the third page (X0008) and fourth page (X0033) exceeds 16; therefore, a new window is needed for the fourth page (X0033) and the forth page (X0033) is read into window 115 shown in FIG. 1. The fifth, sixth, and seventh pages (X0002, X0003, and X0002) in the list are read into window 110, because they satisfy the requirement of Window_Range. The eighth page (X003A) is read into window 115, because Window_Range between X0033 and X003A is more than 16. Now, the buffer (including window 110 and window 115) has 8 pages. Window 110 has 6 pages and window 115 has 2 pages.

Next, the most effective segment prefetch is calculated. A segment size will be defined depending on a prefetch capability. The parameter of Window_Size define the segment size. If Window_Size exceeds a predetermined value, the segment prefetch will be triggered. In the example shown in FIG. 1, Window_Size is set as 4; therefore, if the number of pages in a window exceeds 4, the segment prefetch is triggered. Window 110 now has 6 pages; therefore, the computer system triggers the segment prefetch and gets the pages X0001, X0005, X0008, X0002, X0003, and X0002 in window 110 using an asynchronous I/O.

After the first time of the segment prefetch, there are 2 pages (X0033 and X003A) in the buffer. The computer system start to read rest pages in the list into the buffer. The computer system adds pages X0038, X0031, X003D, and X003 B into the window previously including X0033 and X003A, because all these pages satisfy the requirement of Window_Range (which is 16 in the example). Now, X0033, X003A X0038, X0031, X003D, and X003B are in window 120 shown in FIG. 1. The computer system reads pages X000B and X000A into window 125 shown in FIG. 1, because these two pages do not satisfy the requirement of Window_Range (which is 16 in the example). Window 120 now has 6 pages and Window_Size of 4 is exceeded; therefore, the computer system triggers the second time of the segment prefetch. The computer system gets the pages X0033, X003A X0038, X0031, X003D, and X003B in window 120 using an asynchronous I/O.

After the second time of the segment prefetch, there are 2 pages (X000B and X000A) in the buffer. The computer system again start to read rest pages still in the list into the buffer. The computer system adds pages X0009, X0006, and X000C into the window previously including X000B and X000A, because all these pages satisfy the requirement of Window_Range (which is 16 in the example). Now, X000B, X000A, X0009, X0006, and X000C are in window 130 shown in FIG. 1. The computer system reads page X0088 into window 135 shown in FIG. 1, because this page does not satisfy the requirement of Window_Range (which is 16 in the example). Window 130 now has 5 pages and Window_Size of 4 is exceeded; therefore, the computer system triggers the third time of the segment prefetch. The computer system gets the pages X000B, X000A, X0009, X0006, and X000C in window 130 using an asynchronous I/O.

Figure 2:
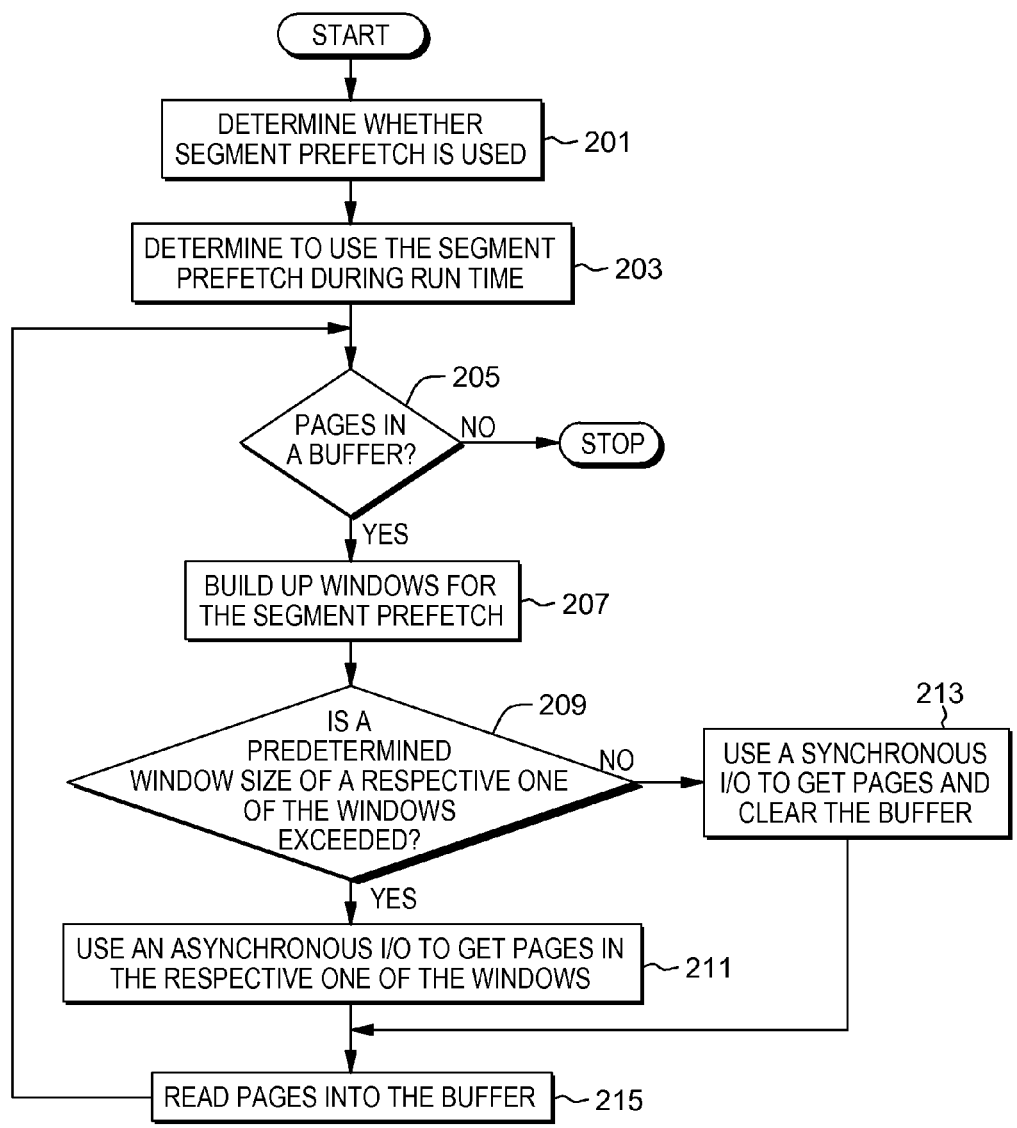
FIG. 2 is a flowchart showing operational steps for implementing segment prefetch, in accordance with one embodiment of the present invention.

FIG. 2 is a flowchart showing operational steps for implementing segment prefetch, in accordance with one embodiment of the present invention. At step 201, a prefetch engine determines whether segment prefetch is used. The prefetch engine decides whether a computer system should apply segment prefetch during run time based on the statistics in a data catalog. At step 203, the computer system determines to use the segment prefetch during the run time. At this step, the computer system builds up a structure for the segment prefetch and initializes a buffer.

At decision block 205, the computer system determines whether there are one or more pages in the buffer. In response to determining that there is no page in the buffer (NO branch of decision block 205), the computer system exists the process of the segment prefetch. In response to determining that there are one or more pages in the buffer (YES branch of decision block 205), the computer system at step 207 builds up windows for the segment prefetch. The example presented in previous paragraphs with reference to FIG. 1 shows how the computer system builds up windows by reading pages into buffer. During building up the windows, the Window_Range parameter is used to determine the maximum distance between two neighboring pages in a window.

At decision block 209, the computer system determines whether a predetermined window size of a respective one of the windows is exceeded. The example presented in previous paragraphs with reference to FIG. 1 shows how the computer system determines whether the segment prefetch should be triggered. During building up the windows, the Window_Size parameter is used as a threshold of pages (or maximum pages in a window) that triggers segment prefetch.

In response to determining that the predetermined window size of the respective one of the windows is exceeded (YES branch of decision block 209), the computer system at step 211 uses an asynchronous I/O to get pages in the respective one of the windows. When the computer system determines that Window_Size for a window is exceeded, the computer system triggers the segment prefetch and get the pages through the asynchronous I/O.

In response to determining that the predetermined window size of the respective one of the windows is not exceeded (NO branch of decision block 209), the computer system at step 213 uses a synchronous I/O to get pages and clear the buffer. Under the situation where the predetermined window size is not exceeded, the computer system cannot trigger the segment prefetch and, as a result, the number of pages in the buffer will increase. Therefore, the computer system clear the buffer by getting the pages through the synchronous I/O, when the number of the windows exceeds a predetermined threshold.

Referring to FIG. 2, after step 211 or step 213, the computer system at step 215 reads more pages into the buffer and then reiterates step 205. After performing the segment prefetch through the asynchronous I/O at step 211 or getting pages through the synchronous I/O at step 213, the computer system loads more pages in the buffer for the next cycle of the segment prefetch.

An example shows how the segment prefetch is implemented in SQL (Structured Query Language). SQL statements are as follows:

```
SELECT *
FROM T1
WHERE C1 = ?
    AND C2 IN (?, ?, ?, ?)
    AND C3 = ?
    Index IX1(C1, C2, C3)
```

Figure 3:
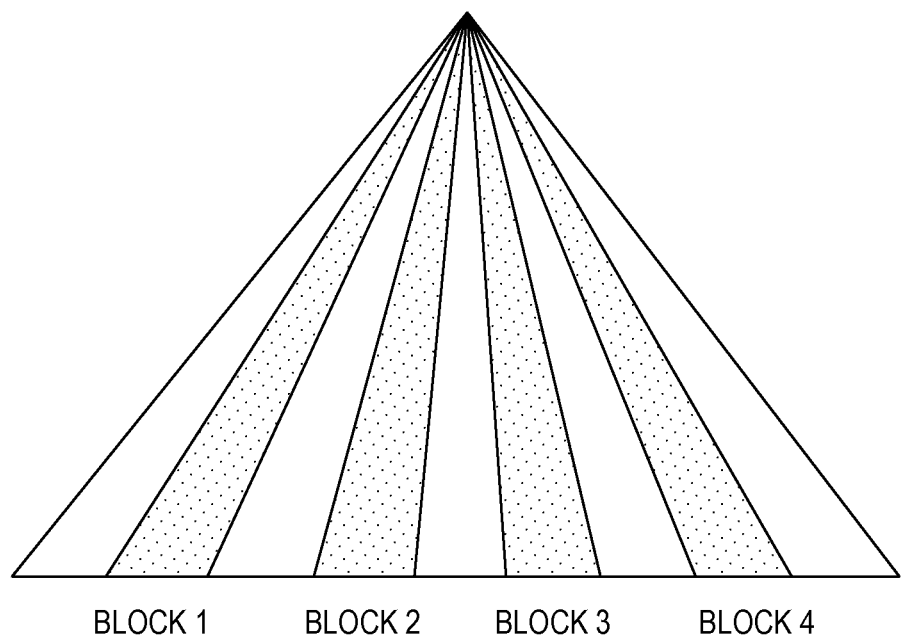
FIG. 3 is a diagram illustrating an example of data blocks in implementing segment prefetch, in accordance with one embodiment of the present invention.

Because "C1=?" and "C2 IN (?, ?, ?, ?)" are matching predicates and "C3=?" is a screening predicate, for the condition where distribution data is basically presented as blocks shown in FIG. 3, a reading data will happen in blocks 1, 2, 3, and 4 in FIG. 3. However, because the data arrival is not in sequence, dynamic prefetch cannot be applied. Under this situation, the method of the segment prefetch reads, according the distance between data pages, the data pages to a buffer. Therefore, even though the data pages are not in sequence, the prefetch is still be effectively performed by the method of segment prefetch.

For example, if the sequence of the data arrival is blocks 1, 3, 4, 2, 4, 3, 1, 2, 3, 2, 4, and 1, the dynamic prefetch cannot be triggered. In the traditional dynamic fetch, a runtime data reading trend corresponds a completely continuous trend in a data block (for example, block 1, 1, 1, 1, . . . or block 2, 2, 2, 2, . . . ). However, in the segment prefetch, data reading trend can be noncontinuous in a data block (for example, blocks 1, 3, 4, 2, 4, 3, 1, 2, 3, 2, 4, and 1). Reading data pages according to the distance between data pages, a computer system using the method of segment prefetch gets pages close to each other through an asynchronous I/O.

Figure 4:
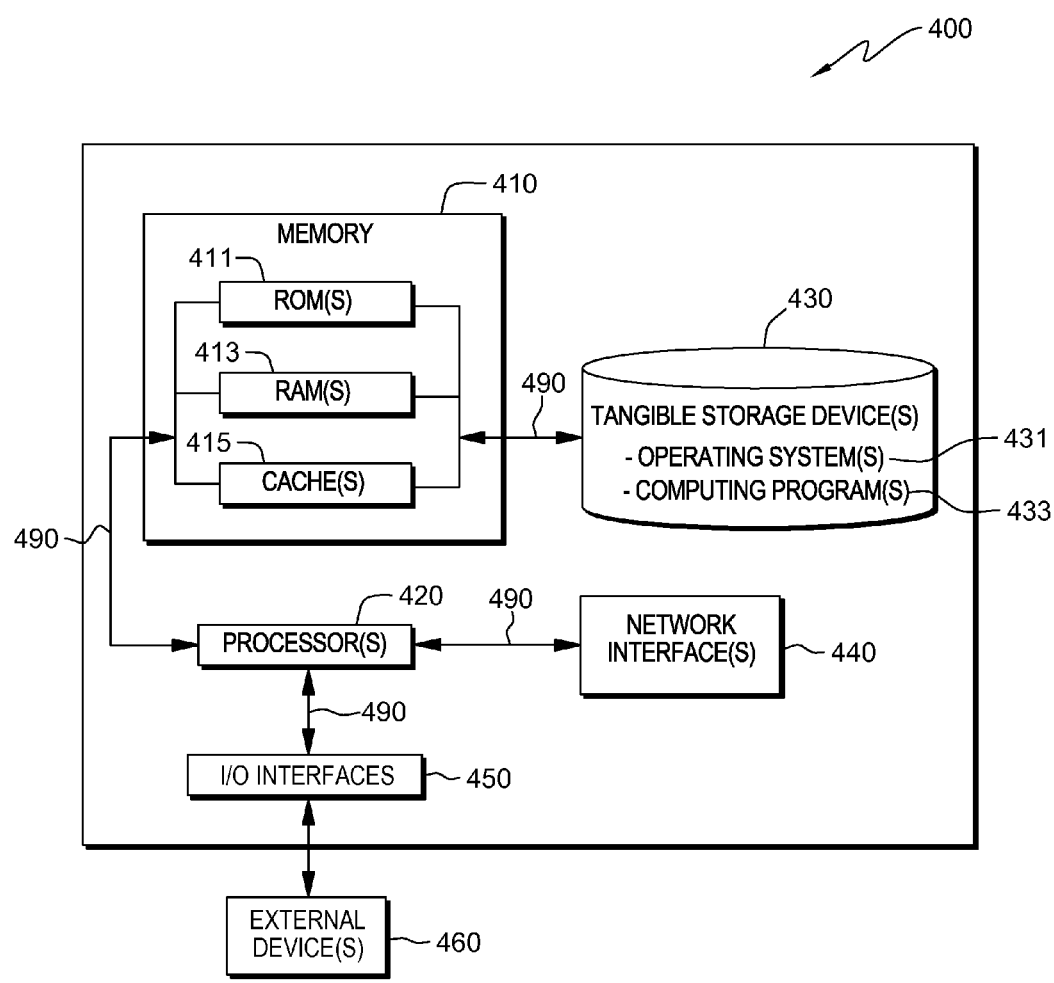
FIG. 4 is a diagram illustrating components of a computer device hosting one or more computer programs for implementing segment prefetch, in accordance with one embodiment of the present invention.

FIG. 4 is a diagram illustrating components of computer device 400 hosting one or more computer programs for implementing segment prefetch, in accordance with one embodiment of the present invention. It should be appreciated that FIG. 4 provides only an illustration of one implementation and does not imply any limitations with regard to the environment in which different embodiments may be implemented.

Referring to FIG. 4, computer device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 430. The computer programs for implementing segment prefetch resides on one or more computer readable tangible storage device(s) 430. Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for implementing multiple window based segment prefetch used for data pages that are out of sequence, the method comprising:
    initiating, by a computer, a buffer for the segment prefetch;
    building up, by the computer, windows in the buffer, each of the windows comprising data pages among which neighboring data pages are within a predetermined distance therebetween;
    determining, by the computer, whether a respective one of the windows exceeds a predetermined window size;
    triggering, by the computer, the segment prefetch, in response to determining that the respective one of the windows exceeds the predetermined window size;
    using an asynchronous I/O to get the data pages in the respective one of the windows; and
    using, by the computer, a synchronous I/O to get the data pages in the respective one of the windows, in response to determining that the respective one of the windows does not exceed the predetermined window size, and clearing the buffer, in response to determining that a number of the windows in the buffer exceeds a predetermined threshold.

2. The method of claim 1, further comprising:
    determining, by the computer, whether the segment prefetch is used.

3. The method of claim 1, further comprising:
    determining, by the computer, to use the segment prefetch during run time.

4. The method of claim 1, further comprising:
    determining, by the computer, whether one or more of the data pages are in the buffer.

5. The method of claim 1, further comprising:
    reading, by the computer, the data pages into the windows in the buffer.

6. A computer program product for implementing multiple window based segment prefetch used for data pages that are out of sequence, the computer program product comprising a computer readable storage medium having program code embodied therewith, the program code executable to:
    initiate a buffer for the segment prefetch;
    build up windows in the buffer, each of the windows comprising data pages among which neighboring data pages are within a predetermined distance therebetween;
    determine whether a respective one of the windows exceeds a predetermined window size;
    trigger the segment prefetch, in response to determining that the respective one of the windows exceeds the predetermined window size;
    use an asynchronous I/O to get the data pages in the respective one of the windows; and
    use, by the computer, a synchronous I/O to get the data pages in the respective one of the windows, in response to determining that the respective one of the windows does not exceed the predetermined window size, and clear the buffer, in response to determining that a number of the windows in the buffer exceeds a predetermined threshold.

7. The computer program product of claim 6, further comprising the program code executable to:
    determine whether the segment prefetch is used.

8. The computer program product of claim 6, further comprising the program code executable to:
    determine to use the segment prefetch during run time.

9. The computer program product of claim 6, further comprising the program code executable to:
    determine whether one or more of the data pages are in the buffer.

10. The computer program product of claim 6, further comprising the program code executable to:
    read the data pages into the windows in the buffer.

11. A computer system for implementing multiple window based segment prefetch used for data pages that are out of sequence, the computer system comprising:
    one or more processors, one or more computer readable tangible storage devices, and program instructions stored on at least one of the one or more computer readable tangible storage devices for execution by at least one of the one or more processors, the program instructions executable to:

initiate a buffer for the segment prefetch;

build up windows in the buffer, each of the windows comprising data pages among which neighboring data pages are within a predetermined distance therebetween;

determine whether a respective one of the windows exceeds a predetermined window size;

trigger the segment prefetch, in response to determining that the respective one of the windows exceeds the predetermined window size;

use an asynchronous I/O to get the data pages in the respective one of the windows; and use, by the computer, a synchronous I/O to get the data pages in the respective one of the windows, in response to determining that the respective one of the windows does not exceed the predetermined window size, and clear, by the computer in response to determining that a number of the windows in the buffer exceeds a predetermined threshold.

12. The computer system of claim 11, further comprising the program instructions executable to:
determine whether the segment prefetch is used.

13. The computer system of claim 11, further comprising the program instructions executable to:
determine to use the segment prefetch during run time.

14. The computer system of claim 11, further comprising the program instructions executable to:
determine whether one or more of the data pages are in the buffer.

15. The computer system of claim 11, further comprising the program instructions executable to:
read the data pages into the windows in the buffer.

* * * * *